US012157431B2

(12) United States Patent
Dennis

(10) Patent No.: US 12,157,431 B2
(45) Date of Patent: Dec. 3, 2024

(54) CONNECTOR ASSEMBLY

(71) Applicant: APPLE INC., Cupertino, CA (US)

(72) Inventor: Nathaniel J. Dennis, Saratoga, CA (US)

(73) Assignee: APPLE INC., Cupertino, CA (US)

(*) Notice: Subject to any disclaimer, the term of this patent is extended or adjusted under 35 U.S.C. 154(b) by 0 days.

(21) Appl. No.: 18/224,128

(22) Filed: Jul. 20, 2023

(65) Prior Publication Data

US 2024/0042961 A1  Feb. 8, 2024

Related U.S. Application Data

(60) Provisional application No. 63/387,371, filed on Dec. 14, 2022, provisional application No. 63/394,418, filed on Aug. 2, 2022.

(51) Int. Cl.
*B60R 22/343* (2006.01)
*B60R 22/02* (2006.01)
*B60R 22/48* (2006.01)

(52) U.S. Cl.
CPC ............ *B60R 22/343* (2013.01); *B60R 22/02* (2013.01); *B60R 22/48* (2013.01); *B60R 2022/029* (2013.01); *B60R 2022/4833* (2013.01)

(58) Field of Classification Search
CPC ............ B60R 22/48; B60R 2022/4816; B60R 22/343; B60R 2022/4825; B60R 22/22; B60R 2022/4833; B60R 2022/029

USPC ................ 280/807, 801.1; 701/45
See application file for complete search history.

(56) References Cited

U.S. PATENT DOCUMENTS

| | | | | |
|---|---|---|---|---|
| 5,904,371 A * | 5/1999 | Koning | ................. | B60R 22/415 280/806 |
| 6,631,865 B2 * | 10/2003 | Palliser | ................. | B60R 22/415 242/382.2 |
| 6,719,325 B2 * | 4/2004 | Ingemarsson | ..... | B60R 21/01556 180/273 |
| 10,569,737 B2 * | 2/2020 | Kleinert | ................. | B60R 22/357 |
| 11,052,868 B2 * | 7/2021 | Brosowski | ............ | B60R 22/415 |
| 11,059,453 B2 * | 7/2021 | Thomas | ................... | B60R 22/48 |
| 2019/0031139 A1 * | 1/2019 | Liteplo | ................... | B60R 22/48 |
| 2020/0282949 A1 | 9/2020 | Yamamoto | | |
| 2020/0331428 A1 | 10/2020 | Thomas | | |
| 2022/0161750 A1 * | 5/2022 | Thomas | ............ | B60R 21/01566 |

* cited by examiner

*Primary Examiner* — Paul N Dickson
*Assistant Examiner* — Caitlin Anne Miller
(74) *Attorney, Agent, or Firm* — Young Basile Hanlon & MacFarlane, P.C.

(57) ABSTRACT

A system for securing a restraint system includes a retractor enclosing a spool, a sensor coupled to the spool, and a motor coupled to the spool and configured to rotate the spool about a spool rotation axis. The system also includes webbing configured to be wound and unwound from around the spool. An automatic locking retractor mode is enabled and disabled to selectively and automatically lock the retractor to prevent rotation of the spool when a predetermined length of the webbing is unwound from the spool.

23 Claims, 5 Drawing Sheets

CONNECTOR ASSEMBLY

CROSS-REFERENCE TO RELATED APPLICATION(S)

This application claims priority to and the benefit of U.S. Provisional Patent Application No. 63/394,418, filed Aug. 2, 2022, and claims priority to and the benefit of U.S. Provisional Patent Application No. 63/387,371, filed Dec. 14, 2022, the entire disclosures of which are incorporated by reference herein.

FIELD

The present disclosure relates generally to the field of connector assemblies.

BACKGROUND

Automatic connector assemblies can be used to secure a restraint system. However, when the automatic connector assembly is engaged, it can be difficult to ensure a sufficient length of webbing to secure the restraint system without inducing the retraction of the automatic connector assembly.

SUMMARY

One aspect of the disclosure, according to an implementation, is a system for securing a restraint system in a vehicle. The system includes a retractor configured to be coupled to a vehicle body of a vehicle, the retractor including a spool, a rotation sensor coupled to the spool, and a motor coupled to the spool and configured to rotate the spool about a spool rotation axis. The system also includes a webbing configured to be wound and unwound from around the spool. The motor is configured to selectively activate an auto locking retractor mode and automatically arrest the retractor to prevent rotation of the spool when a predetermined length of the webbing is unwound from the spool, and the motor is configured to selectively reactivate the auto locking retractor mode when a restraint system is secured in the vehicle.

In some aspects, the auto locking retractor mode is configured to be selectively disabled to allow the webbing to be unwound from the spool and activate retraction of the webbing of the spool around the spool rotation axis to wind the webbing around the spool.

In some aspects, the system further includes a vehicle sensor configured to detect the restraint system, and the auto locking retractor mode is activated when the vehicle sensor detects the restraint system within an interior of the vehicle.

In some aspects, the auto locking retractor mode is disengaged when the vehicle sensor detects the webbing is extended to the predetermined length and secured to the restraint system and the auto locking retractor mode is engaged to initiate retraction of the webbing when the vehicle sensor detects an installation position of the restraint system.

In some aspects, the vehicle sensor is configured to determine when the restraint system includes a top tether, and when the top tether is included, a safety check is performed to determine if the top tether is correctly installed.

In some aspects, the system further includes a voice sensor, and the auto locking retractor mode is configured to activate when the voice sensor receives a predetermined voice command.

In some aspects, the system further includes a user interface, and the auto locking retractor mode configured to activate when the user interface receives a user command.

In some aspects, the motor is configured to activate to prevent rotation of the spool when the predetermined length of the webbing is unwound from the spool.

In some aspects, the auto locking retractor mode is configured to activate when the rotation sensor determines that the spool has unwound a predetermined length of webbing.

In some aspects, the system further includes a latch plate attached to an end of the webbing, and a buckle coupled to the vehicle and configured to receive the latch plate. The auto locking retractor mode is configured to deactivate and retraction of the webbing is configured to be initiated when the latch plate is received by the buckle.

Another aspect of the disclosure, according to an implementation, is a vehicle. The vehicle includes a seat and a system for securing a restraint system. The system for securing the restraint system includes a retractor including a spool, a rotation sensor coupled to the spool, and a retractor assembly coupled to the spool and configured to control a rotation of the spool about a spool rotation axis. The system for securing the restraint system also includes a seatbelt webbing coupled at one end to the spool and configured to be wound and unwound from around the spool. The retractor assembly is configured to be selectively disabled to allow extension of the seatbelt webbing to secure the restraint system in the vehicle and selectively enabled to automatically retract the seatbelt webbing to cinch the restraint system to the seat.

In some aspects, the vehicle further includes a vehicle sensor configured to detect the restraint system, and an auto locking retractor mode is configured to activate when the vehicle sensor detects the restraint system within an interior of the vehicle.

In some aspects, the auto locking retractor mode is configured to disengage when the vehicle sensor detects the seatbelt webbing is extended to a predetermined length and secured to the restraint system and the auto locking retractor mode is configured to engage to initiate retraction of the seatbelt webbing when the vehicle sensor detects restraint system is positioned on the seat.

In some aspects, the vehicle sensor is configured to determine when the restraint system includes a top tether based on information, and when the top tether is included, the vehicle sensor is configured to initiate a safety check to determine if the top tether is correctly installed.

In some aspects, the vehicle further includes a user interface, and the auto locking retractor mode is activated when the user interface receives a user command.

In some aspects, the vehicle further includes a seatbelt buckle coupled to the vehicle and a latch plate attached to an end of the seatbelt webbing. The seatbelt buckle is configured to receive the latch plate of the seatbelt and retraction of the seatbelt webbing is configured to initiate when the latch plate is received by the seatbelt buckle.

Another aspect of the disclosure, according to an implementation, is a method for installing a restraint system in a vehicle. The method includes determining an installation status of the restraint system, automatically locking a seatbelt webbing of the vehicle in an extended position to allow the seatbelt webbing to engage with and secure the restraint system, and automatically retracting the seatbelt webbing when installation of the restraint system is complete.

In some aspects, automatically locking the seatbelt webbing in the extended position includes disengaging an auto locking retractor mode of a seatbelt retractor assembly coupled with the seatbelt webbing.

In some aspects, automatically retracting the seatbelt webbing is initiated when a command is received via a user interface of the vehicle.

In some aspects, automatically retracting the seatbelt webbing is initiated when a latch plate coupled with the seatbelt webbing is received in a seatbelt buckle coupled with the vehicle.

DETAILED DESCRIPTION

The disclosure relates to systems and methods to secure a restraint system, such as, for example and without limitation, a child restraint system, a pet restraint system, a cargo restraint system, or an adolescent or adult special needs restraint system in a vehicle. Seatbelts include an Automatic Locking Retractor (ALR) and are designed to enter an ALR mode (e.g., auto locking retractor mode) to restrain the restraint system within the vehicle. The ALR locks when the continuous motion of spooling the seatbelt from a retractor is stopped. Once the seatbelt is in place and the seatbelt latch plate is inserted into the buckle, the ALR allows the extra seatbelt webbing to retract into the retractor until the webbing is tight around the restraint system and the slack in the seatbelt webbing is removed. To prevent the seatbelt webbing from becoming loose around the restraint system, a bar locks into a spool of the retractor with gears and prevents any further webbing from being released. A limitation of the ALR is that once the webbing is locked in place, more webbing cannot be withdrawn from the retractor. Additionally, a second limitation of the ALR is that a retraction assembly such as a spool spring of the retractor is still active and is constantly trying to spool in or retract the seatbelt webbing. This can inhibit installation of the restraint system if more webbing is needed to secure the restraint system as the installation cannot proceed until the webbing is fully retracted within the retractor and withdrawn again from the retractor. Furthermore, it can be difficult to remove the slack from the webbing once the restraint system is installed in a manner sufficient to rotate a toothed wheel enough to engage the next tooth of the wheel with the locking pawl of the ALR in the retractor to sufficiently secure the restraint system in the vehicle.

Figure 1:
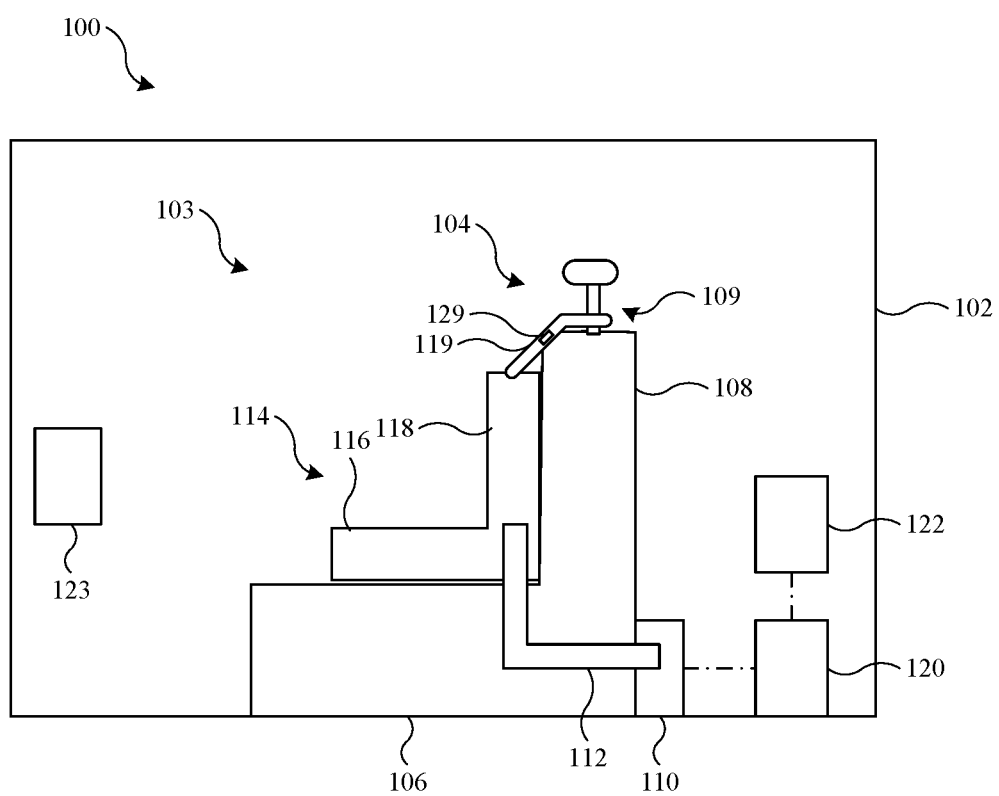
FIG. 1 is a schematic illustration of a vehicle including a retractor assembly that includes an auto locking retractor, according to an implementation.

FIG. 1 illustrates a vehicle 100 that includes a seatbelt retractor assembly 110 (e.g., a retractor assembly or seatbelt retractor) that includes an electronically controllable ALR. By electronically controlling activation of the ALR, the installation experience of a restraint system is improved. In various implementations, the seatbelt retractor assembly 110 includes a locking assembly, such as a pawl, that prevents the spool of the seatbelt retractor assembly 110 from rotating (e.g., arrest the retractor assembly) when there is a pulling force on a seatbelt webbing 112 (e.g., webbing). In various implementations, one element in the seatbelt retractor assembly 110 is a spool which is attached to one end of the seatbelt webbing 112. A spring applies a torque to rotate the spool to wind up loose portions of the seatbelt webbing 112. Further details of the seatbelt retractor assembly 110 are discussed below.

The vehicle 100 includes a vehicle body 102. The vehicle body 102 can be a vehicle structure to which vehicle components, such as seats, are attached. The vehicle body 102 defines a vehicle interior 103. A seat 104 is coupled to the vehicle body 102 and is positioned within the vehicle interior 103. In the illustrated implementation, one seat 104 is shown; however, other implementations may include two, three, four or more seats positioned either forward-facing, rearward-facing, or both, within the vehicle interior 103.

The seat 104 includes a seat base 106 and a seat back 108. Each of the seat base 106 and the seat back 108 are formed from a rigid structure covered by a compressible material such as foam that is then covered with an outer layer of fabric, leather, or other material. In some implementations, the seat 104 also includes a headrest 109 extending upward from the seat back 108.

A restraint system 114 is illustrated as positioned forward-facing on the seat 104. The restraint system 114 includes a base portion 116 coupled with a back portion 118. In some implementations, the restraint system also includes a top tether 119. The top tether 119 is configured to secure the restraint system 114 to the headrest 109 of the seat 104. The restraint system 114 is designed to be secured to the seat 104 using, in some implementations, the seatbelt webbing 112 that is wound and unwound from the seatbelt retractor assembly 110. The seatbelt webbing 112 passes through one or more openings in the restraint system 114. While the restraint system 114 is illustrated as forward-facing in the various figures, the methods and systems described can also be used with the restraint system 114 when installed in a rearward-facing configuration. While the restraint system 114 is illustrated as a child seat, the methods and systems described can also be used with a bucket-style or other style of restraint system.

Figure 2:
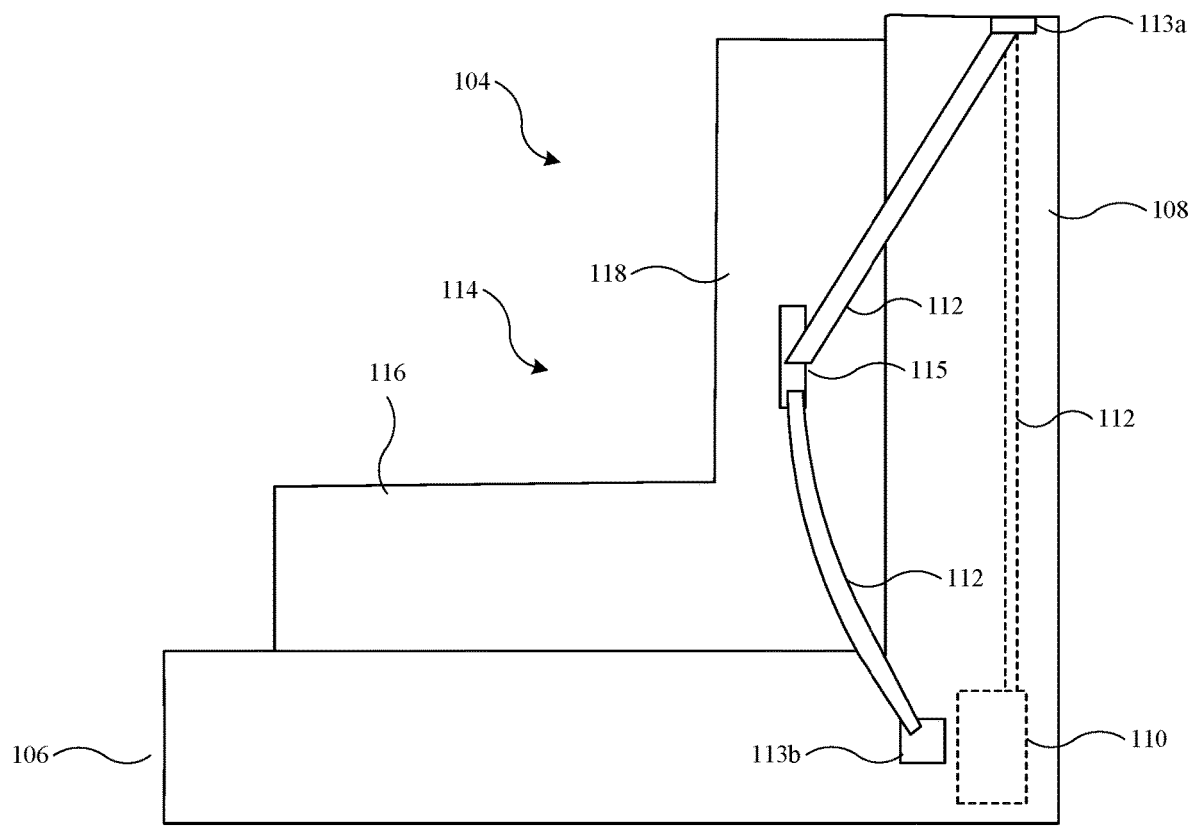
FIG. 2 is a schematic side view illustration of a restraint system installed with a seatbelt retractor assembly, according to an implementation.
Figure 3:
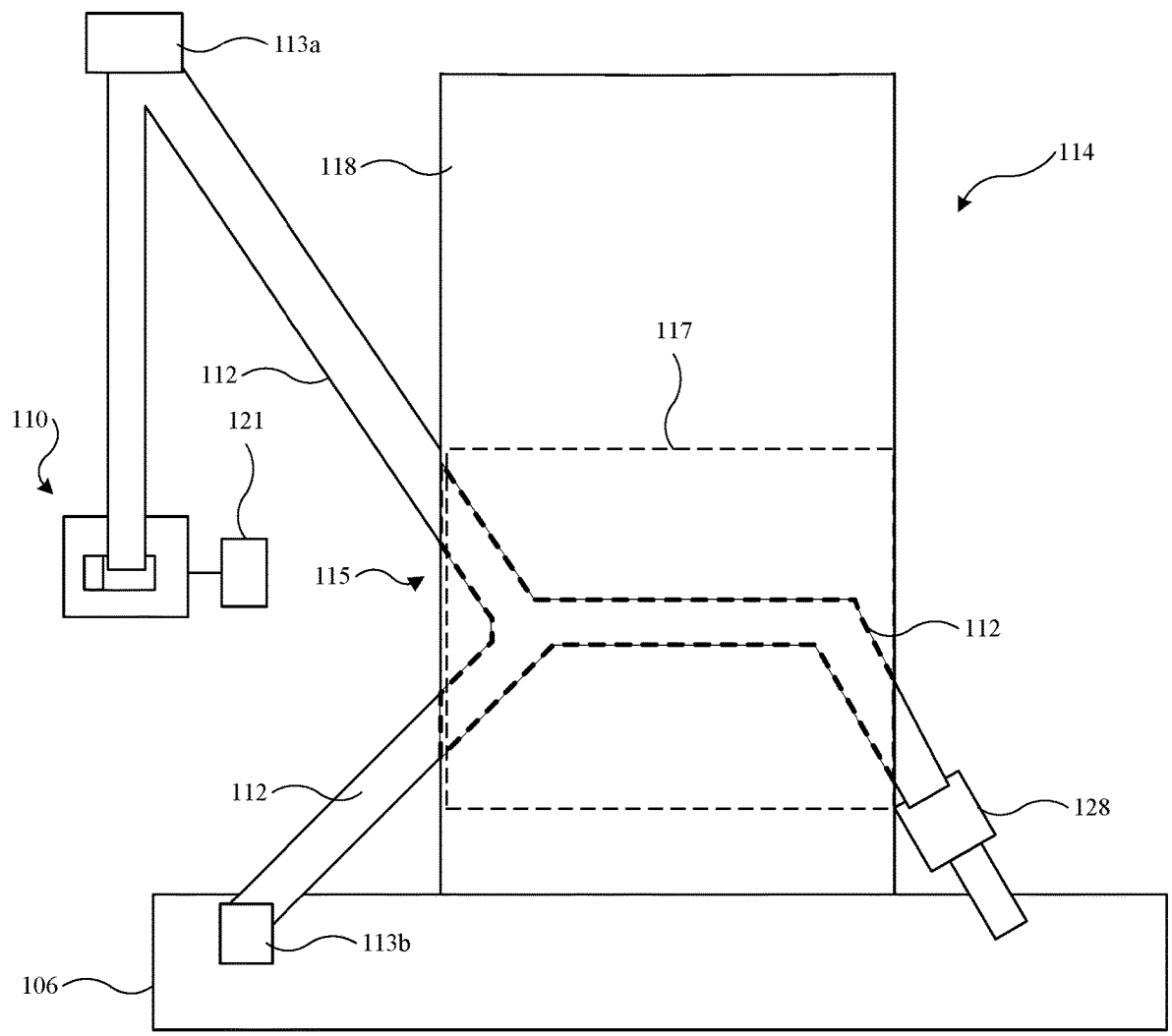
FIG. 3 is a schematic rear view illustration of the restraint system installed with the seatbelt retractor assembly of FIG. 2.

FIGS. 2 and 3 illustrate the restraint system 14 as installed on the seat 104. The restraint system 114 includes an anchor location 115. In various implementations, the anchor location 115 includes a passage 117 that extends through the back portion 118 of the restraint system 114.

To install the restraint system 114 in the vehicle 100, the seatbelt webbing 112 is threaded into the anchor location 115 such that the seatbelt webbing 112 extends through the passage 117 from one side of the back portion 118 of the restraint system 114 to the other side of the back portion 118 of the restraint system 114. To thread the seatbelt webbing 112 through the anchor location 115 from one side of the restraint system 114 to the opposite side requires the seatbelt webbing 112 to be slack, that is, without tension applied by the seatbelt retractor assembly 110. During installation, there may be insufficient length or slack in the seatbelt webbing 112 to extend fully through the passage 117 in the restraint system 114 such that the seatbelt webbing 112 can be snapped into the buckle to secure the restraint system 114 to the seat 104. This lack of slack or length may require a full release and retraction of the seatbelt webbing 112 to release the hold on the seatbelt webbing 112 by the seatbelt retractor assembly 110. It may be difficult to achieve the needed amount of slack and length of seatbelt webbing 112 without triggering the hold feature of the seatbelt retractor assembly 110.

Figure 4:
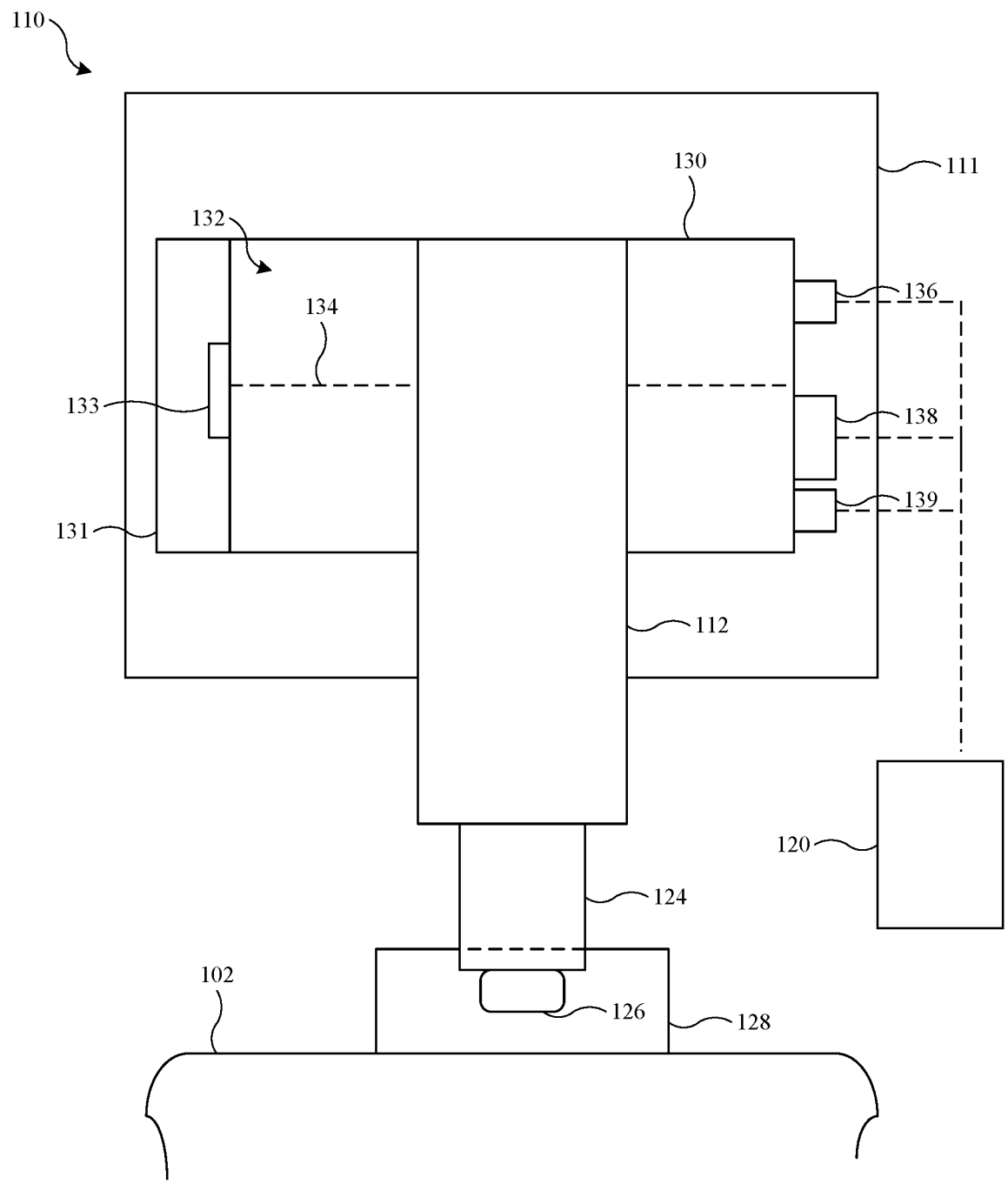
FIG. 4 is a schematic illustration of the retractor assembly shown in FIG. 1, according to an implementation.

With reference to FIG. 4, the seatbelt retractor assembly 110 includes a spool 130 and a retractor assembly 131 connected to the spool 130. The spool 130 is attached to one end of the seatbelt webbing 112. The retractor assembly 131 includes, in some implementations, a spring that applies a rotation force or torque to the spool 130 that rotates the spool 130 to wind up loose seatbelt portions of the seatbelt webbing 112. The retractor assembly 131 also includes a locking assembly, such as a pawl, to stop the spool 130 from rotation and hold or restrain the seatbelt webbing 112. The spool 130 can be locked from rotation and the lock can be triggered by both vehicle movement and movement of the seatbelt webbing 112. The retractor assembly 131 includes, in various implementations, a pretensioner. The pretensioner tightens up slack in the seatbelt webbing 112 and generally acts when the vehicle experiences a sudden deceleration. In various implementations, the retractor assembly 131 includes a pre-pretensioner 133 that is an electric, reversible pretensioner that is active throughout use of the vehicle 100, not just during a deceleration event. The pre-pretensioner 133 is, in some implementations, a motor coupled to the spool 130 that applies a force to the seatbelt webbing 112 to remove slack from the seatbelt webbing 112 during installation of the restraint system 114. In various implementations, the retractor assembly 131 includes any method to prevent the spool 130 from retracting the seatbelt webbing 112. In various implementations, the retractor assembly 131 includes any method to arrest rotation or movement of the spool 130 to hold the retractor assembly 131 when a predetermined length of the seatbelt webbing 112 is unwound from the spool 130.

The seatbelt retractor assembly 110 is in electronic communication with a controller 120. The controller 120 is configured to receive data from at least one vehicle sensor, such as a vehicle sensor 122 (shown in FIG. 1) to determine when to initiate an ALR mode to control locking of the seatbelt retractor assembly 110, and when to shut-off or override the ALR mode of the seatbelt retractor assembly 110 to control unlocking and retraction of a spool of the seatbelt retractor assembly 110. In various implementations, the ALR mode is activated when the seatbelt webbing 112 associated with a seat 104 is fully pulled out. In other implementations, the ALR mode is only activated once the seatbelt webbing 112 is pulled out. In some implementations, the ALR mode is activated only when the seatbelt webbing 112 is first pulled out and is not activated in subsequent pulls or tugs on the seatbelt webbing 112. In various implementations, the vehicle sensor 122 is used to detect the presence of the restraint system 114, the orientation of the restraint system 114 (i.e., forward-facing or rearward-facing), the type of restraint system 114 (i.e., if special installation instructions apply, such the restraint system 114 includes the top tether 119, attachment of the top tether 119, etc.), and an installation status of the restraint system 114 (i.e., whether the seatbelt webbing is tightened, the top tether 119 is tightened or slack, etc.).

In some implementations, an ALR mode of the seatbelt retractor assembly 110 is activated manually. In various implementations, the seatbelt retractor assembly 110 includes a mechanical system 121, as shown in FIG. 3. The mechanical system 121 is similar to mechanical systems used to recline rear seats in a vehicle and is used to engage a pall or similar feature within the retractor assembly 131, such as a cable system. The mechanical system 121 includes a lever or button actuation that, when manipulated, is configured to hold or lock the seatbelt webbing 112 when the seatbelt webbing 112 is nearly or fully pulled out from the seatbelt retractor assembly 110. Once the installation of the restraint system 114 is complete (e.g., the seatbelt webbing 112 has been wound through the restraint system 114 as shown in FIG. 3), the retractor assembly 131 of the seatbelt retractor assembly 110 is allowed to function (e.g., retract the seatbelt webbing 112 and hold or lock the seatbelt webbing 112 in case of sudden deceleration or acceleration of the vehicle). Function of the retractor assembly 131 of the seatbelt retractor assembly 110 is triggered in this implementation by pulling an additional amount of seatbelt webbing 112 from the seatbelt retractor assembly 110 or by manipulating a button or lever arm on the mechanical system 121 to retract the activated pall and allow the ALR mode to engage to enable cinching the restraint system 114 to the seat 104.

The mechanical system 121 includes a sensor, in some implementations. The sensor may be in electronic communication with the controller 120 such that the controller 120 is configured to determine when the retractor assembly 131 of the seatbelt retractor assembly 110 has not been returned to normal operation mode, that is, slack has been removed from the seatbelt webbing 112. When the controller 120 determines that the slack has not been removed from the seatbelt webbing 112 either due to a missed cinching operation or some other circumstance, the controller 120 can prevent operation of the vehicle until the slack in the seatbelt webbing 112 has been removed and operation of the seatbelt retractor assembly 110 has returned to normal.

In some implementations, manual activation of an ALR mode is initiated by manipulation of a user interface associated with the mechanical system 121. The seatbelt webbing 112 is extracted from the seatbelt retractor assembly 110 and the locking feature, such as a pall, of the mechanical system 121 will hold the seatbelt webbing at its fully extracted or nearly fully extracted state. Once the restraint system 114 has been installed by threading the seatbelt webbing 112 through the restraint system 114 as shown in FIG. 3, for example, the seatbelt webbing 112 is allowed to retract and cinch the restraint system 114 to the seat 104. The retraction of the seatbelt webbing 112 is initiated by manual manipulation of the mechanical system 121 or by extracting any remaining seatbelt webbing 112 from the seatbelt retractor assembly 110. The seatbelt webbing 112 retracts and the cinching feature, discussed herein, is initiated to securely cinch the restraint system 114 to the seat 104. The ALR mode can be deactivated by unbuckling the seatbelt webbing 112 and allowing the seatbelt webbing 112 to retract within the seatbelt retractor assembly 110. In various implementations, the ALR mode can be selectively activated or deactivated to prevent undesired retraction of the seatbelt webbing 112 during installation of the restraint system 114, as discussed in various implementations herein.

In some implementations, an enhanced ALR mode can be activated by enabling the mechanical system 121. The mechanical system 121 includes, in some implementations, a webbing clamp or spool block. Manual activation of the mechanical system 121 using a user interface such as a button, lever, or activation of an electronic solenoid can lock out or arrest retraction of the seatbelt webbing 112 to allow for easier installation of the restraint system 114. In various implementations, the controller 120 is configured to monitor the status of the seatbelt retractor assembly 110, that is, whether the seatbelt retractor assembly 110 is in a lock out mode in which the seatbelt webbing 112 has slack to allow for installation of the restraint system 114. When the vehicle is in motion, for example, the controller 120 is configured to disable attempts to lock out the seatbelt retractor assembly 110 and, in some implementations, can generate a haptic, visual, auditory, or other notification such as a nuisance tone or error warning.

In various implementations, the controller 120 initiates a safety check or monitor to determine if a top tether 119 is included as part of the restraint system 114. The safety check can include an inspection of the vehicle interior by the vehicle sensor 122, such as a visible light camera or an infrared camera, to visualize when the top tether 119 is included as part of the restraint system 114. In various implementations, as shown in FIG. 1, the top tether 119 includes an infrared (IR) thread, reflective member, or coating integrated into or embedded into the top tether 119 to observe the position of the top tether 119 more easily. In some implementations, the safety check can include receipt by the controller 120 of information regarding the configuration of the restraint system 114, via the vehicle sensor 122 and/or a user input via a user interface. The controller 120 can determine whether the top tether 119 is installed and/or tightened correctly, via data provided by the vehicle sensor 122 and/or via a notification generated by the controller 120. In various implementations, the vehicle sensor 122 can include at least one infrared or visible light sensor such as cameras that observe the vehicle interior 103. In other implementations, the vehicle sensor 122 includes pressure sensors or other sensing technologies that detect a weight positioned on the seat 104. In some implementations, the vehicle sensor 122 includes a noise, audio, or voice sensor. In other implementations, the vehicle sensor 122 includes various sensing technologies that can identify the restraint system 114 including, for example, the type of restraint system, installation details, etc. In various implementations, the vehicle sensor 122 includes an RFID detector to detect an RFID chip installed on the restraint system 114, and use information obtained from the RFID chip to identify the restraint system 114. In various implementations, the vehicle sensor 122 includes a radar sensor to detect a radar cross sectional area identification provided by a unique reflector positioned on the restraint system 114.

The vehicle 100 also includes, in some implementations, a user interface 123 (shown in FIG. 1). The user interface 123 can be a tablet or other input device coupled to the vehicle body 102 and in electronic communication with the controller 120. In some implementations, the user interface 123 is a user device, such as a phone or tablet, which is separate from the vehicle 100 but is in electronic communication with the controller 120. The user interface 123 receives user commands or instructions, such as an instruction to install the restraint system 114, which can trigger one or more actions of the electronically controlled seatbelt retractor assembly 110.

With reference to FIG. 4, which is a schematic illustration of the seatbelt retractor assembly 110 shown in FIG. 1, details of the seatbelt retractor assembly 110 are shown. The seatbelt retractor assembly 110 is configured to be coupled to the vehicle 100. As an example, the seatbelt retractor assembly 110 may be coupled to the vehicle body 102, either directly or indirectly through an intervening structure. The seatbelt retractor assembly 110 includes a housing 111 that encloses the spool 130 and the retractor assembly 131. The spool 130 includes an exterior surface 132 around which the seatbelt webbing 112 is wound and unwound. The seatbelt webbing 112 is coupled at one end to the spool 130. The spool 130 is configured to rotate about a spool rotation axis 134. As discussed herein, the retractor assembly 131 includes a locking assembly (such as a pawl) to prevent rotation of the spool, a pretensioner to prevent rotation of the spool 130 during a deceleration event of the vehicle 100, and a pre-pretensioner 133 to apply a force to the seatbelt webbing 112 to remove slack during installation of the restraint system 114. In various implementations, the pre-pretensioner 133 is a motor coupled to the spool 130 that applies a force to rotate the spool 130 to remove slack from the seatbelt webbing 112 upon receipt of information from the controller 120 and the vehicle sensor 122 that indicates the installation of the restraint system 114 in the vehicle 100.

A rotation sensor 136, such as a Hall effect sensor or spool encoder, is a sensor positioned adjacent to or coupled to the spool 130. In various implementations, the rotation sensor 136 is configured to determine a rotational position of the spool 130. In some implementations, the rotation sensor 136 is configured to detect an element coupled to the seatbelt webbing 112 to determine an amount of seatbelt webbing 112 that has been released or paid out from the seatbelt retractor assembly 110. In some implementations, the rotation sensor 136 is configured to count the number of times that a magnet coupled to the spool 130 passes the rotation sensor 136 to count the number of rotations of the spool 130 which may be used to determine an amount of seatbelt webbing 112 that has been released or paid out from the seatbelt retractor assembly 110. In various implementations, the rotation sensor 136 may be mounted on components of the spool 130. In some implementations, the rotation sensor 136 is mounted to any component of the seatbelt retractor assembly 110 to track the rotating elements, such as the spool 130 of the seatbelt retractor assembly 110. The mounting position of the rotation sensor 136 will determine whether any gear ratio changes are accounted for to track the total length of the seatbelt webbing 112. The rotation sensor 136 is in electronic communication with the controller 120 and provides information related to the rotational position of the spool 130. The controller 120 can determine an amount of seatbelt webbing 112 that has been released or paid out from the seatbelt retractor assembly 110 based on information from the rotation sensor 136 and determine when to activate an ALR mode of the seatbelt retractor assembly 110. The decision of when to activate the ALR mode of the seatbelt retractor assembly 110 may be based on when a predetermined length of seatbelt webbing 112 has been unwound from the spool 130, for example. Activation of the ALR mode enables retraction and locking the seatbelt webbing 112 in response to a force, such as a vehicle deceleration, or pulling on the seatbelt webbing 112.

The seatbelt retractor assembly 110 also includes a motor 138 in electronic communication with the controller 120. In various implementations, the motor 138 is an electric motor. The motor 138 is used to hold a rotational position of the spool 130 or to induce rotation of the spool 130, depending on whether the controller 120 determines that an ALR mode is active such that the ALR holds or locks the seatbelt webbing 112 at a predetermined length or shuts-off, overrides, or disables the ALR mode when the controller 120 determines that slack needs to be taken out of the seatbelt webbing 112, etc., for example and without limitation. In various implementations, the rotation sensor 136 is mounted on the motor 138 or a gearbox (not shown) of the motor 138.

A latch plate body 124 couples a latch plate 126 to the seatbelt webbing 112. The latch plate 126 is received and retained by a seatbelt buckle assembly 128. The seatbelt buckle assembly 128 is coupled to the vehicle body 102, such as directly or by additional webbing (not shown). When installed, the restraint system 114 is retained between the seatbelt retractor assembly 110 and the seatbelt buckle assembly 128 by the seatbelt webbing 112. In various implementations, an ALR mode or ALR features such as locking the seatbelt webbing 112 is deactivated and retraction of the seatbelt webbing 112 is initiated when the latch plate 126 is received by the seatbelt buckle assembly 128.

With continued reference to FIG. 4, the seatbelt retractor assembly 110 also includes an electronic lock 139. The electronic lock 139 is an electronically activated clutch or locking assembly that allows selective extension and retraction of the seatbelt webbing 112 due to controlled rotation of the spool 130. In various implementations, the electronic lock 139 also includes locking components such as a clutch, a gear, a pawl, etc. that engage upon receipt of an electronic signal to restrict rotation of the spool 130. While the seatbelt retractor assembly 110 is shown as having both the motor 138 and the electronic lock 139, some implementations of the seatbelt retractor assembly 110 may include either the motor 138 or the electronic lock 139.

To improve the installation experience of the restraint system 114, the controller 120 is configured to selectively activate and deactivate the ALR mode of the seatbelt retractor assembly 110. Once the ALR mode of the seatbelt retractor assembly 110 is activated, the installer does not need to specify the seat 104 to which the restraint system 114 is to be attached as the rotation sensor 136 of the seatbelt retractor assembly 110 of all seats (not shown) in a given vehicle 100 are monitored by the controller 120 to determine which seatbelt retractor assembly 110 has a predetermined length of seatbelt webbing 112 extended, released, or paid out. Once the spool 130 has reached a terminal rotation position for the seat 104, that is, the maximum amount of seatbelt webbing 112 has been unwound from the spool 130, the seatbelt retractor assembly 110 can disable ALR features such as locking the seatbelt webbing 112 in an extended position. Alternatively, the controller 120 can disable, shut-off, deactivate, or override the ALR mode of the seatbelt retractor assembly 110 to allow the seatbelt webbing 112 to be extended and locked in an extended position to enable the seatbelt webbing 112 to be easily coupled with the restraint system 114. To enable easier installation of the restraint system 114, the controller 120 is configured to selectively deactivate ALR features or an ALR mode of the seatbelt retractor assembly 110 and automatically lock the seatbelt retractor assembly 110 to prevent rotation of the spool 130 when a predetermined length of the seatbelt webbing 112 is unwound from the spool 130. The controller 120 is also configured to selectively reactivate the ALR mode or ALR features of the seatbelt retractor assembly 110 when the restraint system 114 is secured in the vehicle 100. The controller 120 can control the retractor assembly 131 to actively cinch or automatically retract the seatbelt webbing 112 to secure the restraint system 114 when instructed to do so by a user command or via information received from the vehicle sensor 122.

The ALR mode of the seatbelt retractor assembly 110 can also be activated automatically if the vehicle sensor 122, such as an IR or RGB camera or interior radar sensor, detects that a restraint system 114 is being carried or lifted into the vehicle interior 103. In other implementations, the ALR mode of the seatbelt retractor assembly 110 can be activated by a predetermined voice command received by the vehicle sensor 122 or a touch- or gesture-based input into the user interface 123. The predetermined voice command could include a command to install a car seat or may specify a specific seat to which the car seat is to be installed (i.e., right rear seat, rear middle seat, etc.). In various other implementations, the ALR mode of the seatbelt retractor assembly 110 can be activated by an installation command or user command received by a vehicle user interface, such as the user interface 123 which may be a touchscreen installed in the vehicle interior 103 or a phone, tablet, or other connected device in electronic communication with the controller 120. In still other implementations, the ALR mode of the seatbelt retractor assembly 110 can be activated by occupant detection and classification performed by the vehicle sensor 122 and the controller 120 to determine which seat 104 of the vehicle 100 is intended for installation of the restraint system 114.

In various implementations, the ALR mode can be suspended such that the spool 130 of the seatbelt retractor assembly 110 can be automatically locked when the seatbelt webbing 112 is in a fully extended position. In the fully extended position, the seatbelt webbing 112 has slack to enable threading the seatbelt webbing 112 through or around the restraint system 114 as directed to properly secure the restraint system 114 to the seat 104 of the vehicle 100. The spool 130 can be automatically locked, or prevented from rotating, by engaging the motor 138 to hold the spool 130 in a fixed rotational position. In other implementations, the spool 130 can be automatically locked by activating the electronic lock 139 or by any other mechanical locking assembly. Locking the spool 130 with a predetermined length of seatbelt webbing 112 locked out or extended from the seatbelt retractor assembly 110 or seatbelt retractor assembly 210 allows the installer to more easily fish or direct the seatbelt webbing 112 through the passage 117 of the restraint system 114 without having to constantly attempt to keep the seatbelt webbing 112 from retracting back into the spool 130 and risking having to restart the installation process.

Once the seatbelt webbing 112 has been properly routed around and/or through the restraint system 114, the controller 120 disengages, disables, shuts-off, or overrides the seatbelt webbing 112 lockout feature of the seatbelt retractor assembly 110 such that the seatbelt webbing 112 can be released and allowed to retract or wind around the spool 130 within the seatbelt retractor assembly 110. The release of the hold on the seatbelt webbing 112 can be initiated by a voice or user interface command received by the vehicle sensor 122 or the user interface 123. In some implementations, the release of the hold on the seatbelt webbing 112 can be initiated when the latch plate 126 is received within the seatbelt buckle assembly 128. In various implementations, the seatbelt buckle assembly 128 includes a sensor, such as the vehicle sensor 122, that detects when the latch plate 126 engages with the seatbelt buckle assembly 128. Further confirmation that the hold on the seatbelt webbing 112 is to be released and the slack in the seatbelt webbing 112 is to be taken up can be provided by a voice or user interface command or by visual confirmation provided by a camera positioned in the vehicle interior 103. The release of the hold on the seatbelt webbing 112 enables reactivation of the ALR mode of the seatbelt retractor assembly 110.

For some restraint system 114 installations, inserting the latch plate 126 into the seatbelt buckle assembly 128 may be one step of the installation process. Thus, in some implementations, a series of buckle/unbuckle/buckle events are monitored by the controller 120 and if a predetermined sequence of buckle and unbuckle events occurs within a predetermined period, the controller 120 can then activate the seatbelt retractor assembly 110 to retract the seatbelt webbing 112. Alternatively, if an expected series of buckle and unbuckle events does not occur or does not occur within a predetermined period, the seatbelt retractor assembly 110 can indefinitely hold or lock the seatbelt webbing 112 until instructions to release or retract the seatbelt webbing 112 are received by the controller 120.

If a small amount of the seatbelt webbing 112 is left wound around the spool 130 (for example, approximately 50-100 mm), and the rotational position of the spool 130 is being held by the motor 138, an additional tug or pull on the seatbelt webbing 112 during installation will overcome the motor torque holding the spool 130 and release the remaining seatbelt webbing 112. This action of releasing an additional portion of the seatbelt webbing 112 is registered by the rotation sensor 136. The data from the rotation sensor 136 is received by the controller 120 which can then initiate retraction of the seatbelt webbing 112 and tightening, cinching, or snugging of the seatbelt webbing 112 around or through the restraint system 114.

Additionally, in some implementations, the additional tug or pull on the seatbelt webbing 112 to release the additional portion of the seatbelt webbing 112 can indicate to the controller 120, via data received from the rotation sensor 136, that retraction and tightening of the seatbelt webbing 112 is still needed as part of the installation of the restraint system 114. This indication for additional retraction, received as data from the rotation sensor 136, for example, can indicate to the controller 120 to initiate an additional automatic cinching or retracting mode of operation of the seatbelt retractor assembly 110.

Once the seatbelt webbing 112 is successfully routed through the restraint system 114 as shown in FIG. 2, to complete installation, the slack must be removed from the seatbelt webbing 112. Due to the soft and pliable nature of the seat base 106 and the seat back 108 due to a foam construction, for example, it can be difficult for the installer to remove enough slack to properly secure the restraint system 114 to the seat 104. The pre-pretensioner 133 of the retractor assembly 131 can apply a belt force to remove the slack from the seatbelt webbing 112 and cinch the restraint system 114 tightly through the foam or other pliable material of the seat 104. This allows the restraint system 114 to be tightly secured to the seat 104 without requiring strength and effort from the installer to manually cinch or tighten the seatbelt webbing 112.

In some implementations, the controller 120, in combination with the vehicle sensor 122, can identify the type and/or manufacturer of the restraint system 114. The vehicle sensor 122 can identify the manufacturer of the restraint system 114 from observation or scanning of a QR code, visual inspection and comparison with a database of matching images, machine learning, a two-dimensional barcode visible in infrared or visible light, scanning an RFID tag, user selection of the manufacturer by a tactile or verbal user interface, via an electrical connection to the vehicle (if the restraint system 114 is electrically connected to the vehicle), or other identification methods. The identification of the type and/or manufacturer of the restraint system 114 can inform the controller 120 of the amount of tension (e.g., a pretensioning recommendation related to the restraint system 114) to apply to the seatbelt webbing 112 to properly cinch and tighten the restraint system 114 to the seat 104. Based on the manufacturer recommendation, the controller 120 can generate the necessary control signal to control retraction of the seatbelt webbing 112 by the seatbelt retractor assembly 110. For example, one manufacturer may recommend applying 450 N of pretensioning force for 2500 ms to correctly install the restraint system 114. The controller 120 would generate a control signal to the seatbelt retractor assembly 110 to apply the directed pretensioning force for the specified duration to correctly install the identified restraint system 114.

For installations of the restraint system 114 in which the manufacturer or type of restraint system 114 cannot be identified, the controller 120 generates a control signal to direct the seatbelt retractor assembly 110 to apply a predetermined amount of cinching or pretensioning force for a predetermined duration.

In various implementations, the rotation sensor 136, in combination with the controller 120, can act as a safety monitor. If activation of retraction of the seatbelt webbing 112 has not been initiated, a visual, auditory, haptic, or other notification can be provided to indicate that the installation of the restraint system 114 is not complete until retraction of the seatbelt webbing 112 has been initiated or performed. In various implementations, the controller 120 can initiate automatic retraction or cinching of the seatbelt webbing 112 upon receipt of data indicating that slack remains in the seatbelt webbing 112 during an identified installation of the restraint system 114.

In various implementations, the motor 138 of the seatbelt retractor assembly 110 can apply a force to rotate the spool 130 to remove slack from the seatbelt webbing 112 as a smart cinching or retraction feature initiated by the controller 120. In various implementations, the pre-pretensioning force applied by the motor 138 can be approximately 800 N. The motor 138 can apply this force to the seatbelt webbing 112 when directed by the controller 120 to cinch or tighten the seatbelt webbing 112 to secure the restraint system 114 to the seat 104. In various implementations, the pre-pretensioning force can be used to pull the restraint system 114 into the comfort foam or other soft covering of the seat 104. If the full pre-pretensioning force is not needed to remove the slack in the seatbelt webbing 112 or to tightly secure the restraint system 114 to the seat 104, the controller 120 can direct a varied force be applied based on a current vs. time profile. In some implementations, the pre-pretensioning force applied by the motor 138 is based on the recommended cinching force specified by the manufacturer of the restraint system 114.

The vehicle sensor 122 can be used to verify a correct installation of the restraint system 114. For example, cameras positioned within the vehicle interior 103 can capture images of the restraint system 114 such that the controller 120 can determine whether there is any remaining slack in the seatbelt webbing 112 or if a top tether of the restraint system 114 is installed and tightened. In various implementations, the controller 120 can generate a notification or reminder that the installation is not complete (or, in other implementations, that the installation is complete). The notification or reminder may be auditory, visual, or haptic or some other type of notification.

Figure 5:
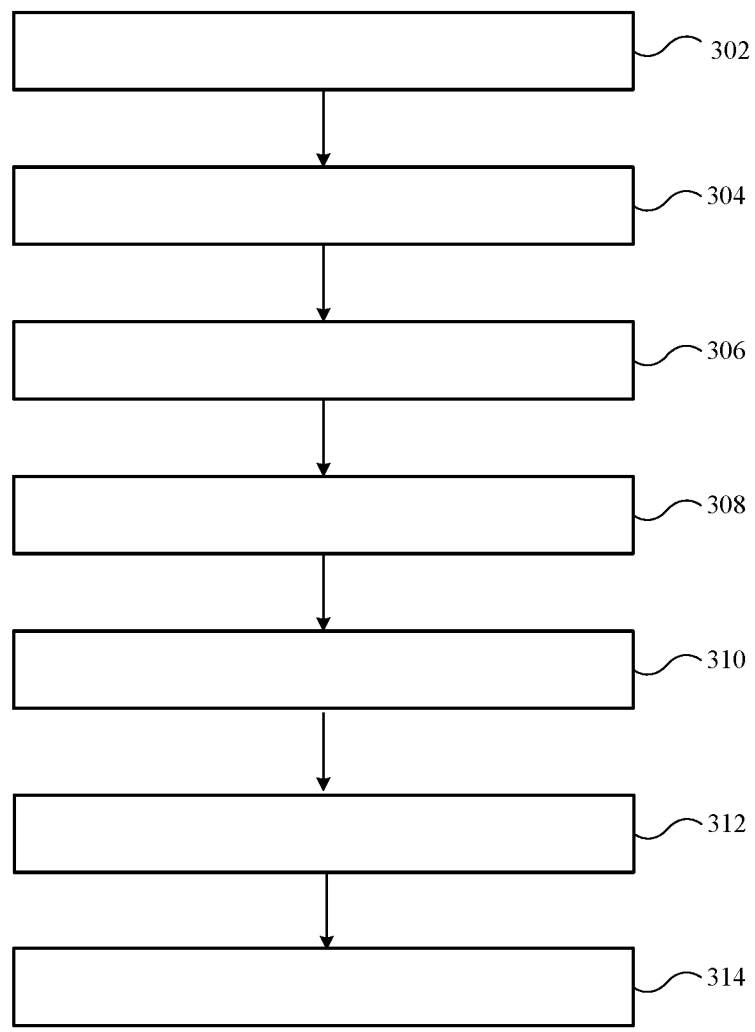
FIG. 5 is a flow chart diagram of a method for installed a restraint system in a vehicle, according to an implementation.

FIG. 5 is a flow diagram of a method 300 for installing a restraint system in a vehicle, such as the restraint system 114 shown secured in the vehicle 100, as illustrated in FIG. 1. The method 300 can be performed by the controller 120 and seatbelt retractor assembly 110 of the vehicle 100. It is understood that the steps of the method 300 may be performed in another order rather than the order shown in FIG. 5.

The method 300 starts with determining an installation status of the restraint system 114, at block 302. The installation status may be determined by assessing if the restraint system 114 is approaching the vehicle 100 or is within the vehicle interior 103 using the vehicle sensor 122.

Next, as shown in block 304, an installation position of the restraint system 114 is determined. A sensor such as the vehicle sensor 122, can determine on which seat 104 of the vehicle 100 the restraint system 114 is to be coupled. A vehicle sensor 122 such as weight sensors and cameras, and seatbelt webbing positions sensors such as the rotation sensor 136, for example and without limitation, can provide this data to the controller 120.

Once the installation position is determined, at block 306 the controller 120 can selectively engage or disengage the ALR mode of the seatbelt retractor assembly 110, as discussed herein. In some implementations, the ALR mode of the seatbelt retractor assembly 110 is selectively deactivated and activated automatically based on, for example, data from the vehicle sensor 122. Deactivation of the ALR mode includes automatic detection of the seat 104 to which the restraint system 114 is being installed and subsequent reactivation of the ALR mode occurs when installation of the restraint system 114 is complete. Deactivation of the ALR mode can occur when the vehicle sensor 122, such as IR or RGB cameras, detect the restraint system 114 is being carried into the vehicle 100. Additionally, the ALR mode can be deactivated by receipt of a voice command, or by interaction with a user interface 123. Automatic retraction of the seatbelt webbing 112 can be overridden or disabled temporarily during installation of the restraint system 114 to enable the installer to thread the seatbelt webbing 112 around and through the restraint system 114 with sufficient slack. In some implementations, the seatbelt webbing 112 is extracted and the motion or extension of the seatbelt webbing 112 is arrested before activating the ALR mode of the seatbelt retractor assembly 110. This allows for extension of the seatbelt webbing 112 to a desired length, including any desired slack, to make it easier to route the seatbelt webbing 112 through and around the restraint system 114 before activating the ALR mode of the seatbelt retractor assembly 110 to retract the slack from the seatbelt webbing 112. In some implementations, the ALR mode of the seatbelt retractor assembly 110 is activated and remains activated during installation of the restraint system 114 but a reaction rotation of the spool 130 is arrested to prevent retraction of the seatbelt webbing 112.

The controller 120 can control the seatbelt retractor assembly 110 to automatically lock the seatbelt webbing 112 in an extended position, as shown in block 308, during installation of the restraint system 114. The "smart locking" feature improves installation of the restraint system 114 by allowing the installer sufficient slack in the seatbelt webbing 112 to correctly install the restraint system 114 to the seat 104. Automatically locking the seatbelt webbing 112 in an extended position allows for easier routing of the seatbelt webbing 112 through and around the restraint system 114 without having to constantly tug on the seatbelt webbing 112 or release and re-extend the seatbelt webbing 112.

As part of a "smart cinching" feature, the controller 120 controls the seatbelt retractor assembly 110 to automatically tighten or retract the seatbelt webbing 112 when the installation of the restraint system 114 is complete, as shown at block 310. The controller 120 can use data from the vehicle sensor 122 to determine when the installation of the restraint system 114 is complete, such as image data, pressure, or weight data from the vehicle sensor 122 that indicate the latch plate 126 is engaged with the seatbelt buckle assembly 128 or that the restraint system 114 is positioned on the seat 104. A completed installation of the restraint system 114 can also be indicated from data from the rotation sensor 136 such as a force applied to the seatbelt webbing 112, etc., for example and without limitation. In some implementations, the controller 120 can use data from the vehicle sensor 122 to identify the type of restraint system 114 and using the identification information, can retract the seatbelt webbing 112 to apply a manufacturer's suggested force or pre-load to the restraint system 114. In some implementations, the data indicating the type of restraint system 114 can be used to remove an amount of movement of the restraint system 114 due to seat foam cushioning compression of the restraint system 114 without placing undue stress on the restraint system 114.

The controller 120 also engages or reengages the ALR mode of the seatbelt retractor assembly 110 when the seatbelt webbing 112 has been positioned around and through the restraint system 114 during the installation process, as shown at block 312. Engagement of the ALR mode and further retraction of the seatbelt webbing 112 can be enabled by a voice or user interface command or when the latch plate 126 is received and retained by the seatbelt buckle assembly 128. Engagement of the ALR mode is performed when the restraint system 114 has been successfully installed in the vehicle 100 such that the seatbelt retractor assembly 110 locks the spool 130 during a vehicle deceleration.

The vehicle sensor 122 can provide confirmation of the installation of the restraint system 114 as shown at block 314. The confirmation can be accompanied by a notification generated by the controller 120. The notification can be a visual, auditory, or other notification that confirms a successful installation or provides instruction of further installation steps, such as attachment or tightening of the top tether 119 of the restraint system 114, for example.

As described above, one aspect of the present technology is the gathering and use of data available from various sources for use during installation of a restraint system. As an example, such data may identify the user and include user-specific settings or preferences. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, a user profile may be established that stores preference of device-type related information that allows installation of a restraint system according to user and manufacturer preferences. Accordingly, use of such personal information data enhances the user's experience.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates implementations in which users selectively block the use of, or access to, personal information data. That is, the present disclosure contemplates that hardware and/or software elements can be provided to prevent or block access to such personal information data. For example, in the case of storing a user profile for installing the restraint system, the present technology can be configured to allow users to select to "opt in" or "opt out" of participation in the collection of personal information data during registration for services or anytime thereafter. In another example, users can select not to provide data regarding usage of specific applications. In yet another example, users can select to limit the length of time that application usage data is maintained or entirely prohibit the development of an application usage profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed implementations, the present disclosure also contemplates that the various implementations can also be implemented without the need for accessing such personal information data. That is, the various implementations of the present technology are not rendered inoperable due to the lack of all or a portion of such personal information data. For example, preference information may be determined each time the restraint system is installed, such as by obtaining needed information in real time from vehicle sensors, and without subsequently storing the information or associating with the particular user.

What is claimed is:

1. A system, comprising:
   a retractor configured to be coupled to a vehicle body of a vehicle, the retractor including a spool, a rotation sensor coupled to the spool, and a motor coupled to the spool and configured to rotate the spool about a spool rotation axis; and
   a webbing configured to be wound and unwound from around the spool,
   wherein the motor is configured to selectively activate an auto locking retractor mode and automatically arrest the retractor to prevent rotation of the spool and hold the retractor in place when a predetermined length of the webbing is unwound from the spool to hold the webbing in an extended position, and the motor is configured to selectively reactivate the auto locking retractor mode when a restraint system is secured in the vehicle.

2. The system of claim 1, wherein the auto locking retractor mode is configured to be selectively disabled to allow the webbing to be unwound from the spool and activate retraction of the webbing of the spool around the spool rotation axis to wind the webbing around the spool.

3. The system of claim 1, further comprising a vehicle sensor configured to detect the restraint system, and the auto locking retractor mode is activated when the vehicle sensor detects the restraint system within an interior of the vehicle.

4. The system of claim 3, wherein the auto locking retractor mode is disengaged when the vehicle sensor detects the webbing is extended to the predetermined length and secured to the restraint system and the auto locking retractor mode is engaged to initiate retraction of the webbing when the vehicle sensor detects an installation position of the restraint system.

5. The system of claim 3, wherein the vehicle sensor is configured to determine when the restraint system includes a top tether, and when the top tether is included, a safety check is performed to determine if the top tether is correctly installed.

6. The system of claim 1, further comprising a voice sensor, and the auto locking retractor mode is configured to activate when the voice sensor receives a predetermined voice command.

7. The system of claim 1, further comprising a user interface, and the auto locking retractor mode is configured to activate when the user interface receives a user command.

8. The system of claim 1, wherein the motor is configured to activate to prevent rotation of the spool when the predetermined length of the webbing is unwound from the spool.

9. The system of claim 1, wherein the auto locking retractor mode is configured to activate when the rotation sensor determines that the spool has unwound the predetermined length of webbing.

10. The system of claim 1, further comprising:
    a latch plate attached to an end of the webbing; and
    a buckle coupled to the vehicle and configured to receive the latch plate,
    wherein the auto locking retractor mode is configured to deactivate and retraction of the webbing is configured to be initiated when the latch plate is received by the buckle.

11. A vehicle, comprising:
    a seat; and
    a system for securing a restraint system, comprising:

a retractor including a spool, a rotation sensor coupled to the spool, and a retractor assembly coupled to the spool and configured to control a rotation of the spool about a spool rotation axis; and a seatbelt webbing coupled at one end to the spool and configured to be wound and unwound from around the spool, wherein the retractor assembly is configured to be selectively disabled to allow extension of the seatbelt webbing to secure the restraint system in the vehicle and selectively enabled to automatically retract the seatbelt webbing to remove slack in the seatbelt webbing and cinch the restraint system to the seat.

12. The vehicle of claim 11, further comprising a vehicle sensor configured to detect the restraint system, and an auto locking retractor mode is configured to activate when the vehicle sensor detects the restraint system within an interior of the vehicle.

13. The vehicle of claim 12, wherein the auto locking retractor mode is configured to disengage when the vehicle sensor detects the seatbelt webbing is extended to a predetermined length and secured to the restraint system and the auto locking retractor mode is configured to engage to initiate retraction of the seatbelt webbing when the vehicle sensor detects the restraint system is positioned on the seat.

14. The vehicle of claim 13, wherein the vehicle sensor is configured to determine when the restraint system includes a top tether based on sensor information, and when the top tether is included, the vehicle sensor is configured to initiate a safety check to determine if the top tether is correctly installed.

15. The vehicle of claim 12, further comprising a user interface, and the auto locking retractor mode is configured to activate when the user interface receives a user command.

16. The vehicle of claim 11, further comprising a seatbelt buckle coupled to the vehicle and a latch plate attached to an end of the seatbelt webbing, wherein the seatbelt buckle is configured to receive the latch plate and retraction of the seatbelt webbing is configured to initiate when the latch plate is received by the seatbelt buckle.

17. A method for installing a restraint system in a vehicle, comprising:

determining that installation of the restraint system is underway;

responsive to determining that installation of the restraint system is underway, automatically locking a seatbelt webbing of the vehicle in an extended position to allow the seatbelt webbing to engage with and secure the restraint system; and automatically retracting the seatbelt webbing when installation of the restraint system is complete.

18. The method of claim 17, wherein automatically locking the seatbelt webbing in the extended position includes disengaging an auto locking retractor mode of a seatbelt retractor coupled with the seatbelt webbing.

19. The method of claim 17, wherein automatically retracting the seatbelt webbing is initiated when a command is received via a user interface of the vehicle.

20. The method of claim 17, wherein automatically retracting the seatbelt webbing is initiated when a latch plate coupled with the seatbelt webbing is received in a seatbelt buckle coupled with the vehicle.

21. The vehicle of claim 11, further comprising a vehicle sensor configured to detect whether the slack in the seatbelt webbing is removed, wherein the vehicle is configured to prevent operation of the vehicle if the vehicle sensor detects that the slack in the seatbelt webbing is not removed.

22. The vehicle of claim 11, wherein the retractor assembly is configured to be selectively enabled to automatically retract the seatbelt webbing to remove the slack in the seatbelt webbing and cinch the restraint system to the seat when the seatbelt webbing is routed through the restraint system.

23. The method of claim 17, wherein determining that installation of the restraint system is underway includes determining that the restraint system is approaching the vehicle or is located within the vehicle.

* * * * *